US009349284B2

(12) United States Patent
Cudak et al.

(10) Patent No.: US 9,349,284 B2
(45) Date of Patent: *May 24, 2016

(54) REGIONAL DRIVING TREND MODIFICATION USING AUTONOMOUS VEHICLES

(71) Applicant: International Business Machines Corporation, Armonk, NY (US)

(72) Inventors: Gary D. Cudak, Wake Forest, NC (US); Christopher J. Hardee, Raleigh, NC (US); Adam Roberts, Moncure, NC (US); Adrian X. Rodriguez, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 132 days.

This patent is subject to a terminal disclaimer.

(21) Appl. No.: 14/260,397

(22) Filed: Apr. 24, 2014

(65) Prior Publication Data

US 2015/0308837 A1   Oct. 29, 2015

(51) Int. Cl.
*G01C 22/00* (2006.01)
*G05D 1/00* (2006.01)
*G08G 1/00* (2006.01)
*G01C 21/26* (2006.01)
*G05D 1/02* (2006.01)

(52) U.S. Cl.
CPC *G08G 1/00* (2013.01); *G01C 21/26* (2013.01); *G05D 1/0088* (2013.01); *G05D 1/0278* (2013.01)

(58) Field of Classification Search
CPC .................. G01C 21/3484; G01C 21/26

USPC .............................................. 701/23
See application file for complete search history.

(56) References Cited

U.S. PATENT DOCUMENTS

| 5,170,352 | A | 12/1992 | McTamaney et al. |
| 5,436,839 | A | 7/1995 | Dausch et al. |
| 6,142,252 | A | 11/2000 | Kinto et al. |
| 6,466,862 | B1 * | 10/2002 | DeKock ............... G08G 1/0104 340/901 |
| 7,565,230 | B2 | 7/2009 | Gardner et al. |

(Continued)

FOREIGN PATENT DOCUMENTS

WO   2013/069054 A1   5/2013
WO   2013/076829 A1   5/2013

OTHER PUBLICATIONS

U.S. Appl. No. 14/835,055, filed Aug. 25, 2015.

(Continued)

*Primary Examiner* — Calvin Cheung
*Assistant Examiner* — Paula L Schneider
(74) *Attorney, Agent, or Firm* — Edward J. Lenart; Grant A. Johnson; Kennedy Lenart Spraggins LLP (57) ABSTRACT

Embodiments of the present invention disclose a method, computer program product, and a computer system for modifying regional driving habits. A computer determines a first value associated with a regional driving habit for a region. The computer determines a second value associated with a target driving habit, wherein the second value is not substantially equivalent to the first value. The computer determines that a number of at least semi-autonomous vehicles in an area is above a threshold value. The computer transmits information instructing the number of at least semi-autonomous vehicles to operate based on the second value.

12 Claims, 5 Drawing Sheets

(56) References Cited

U.S. PATENT DOCUMENTS

| | | | |
|---|---|---|---|
| 7,660,459 B2 | 2/2010 | Busche | |
| 7,974,460 B2 | 7/2011 | Elgersma | |
| 7,979,174 B2 | 7/2011 | Fregene et al. | |
| 8,457,827 B1* | 6/2013 | Ferguson | G05D 1/00 180/169 |
| 9,097,549 B1* | 8/2015 | Rao | G01C 21/3461 |
| 2004/0115597 A1 | 6/2004 | Butt | |
| 2004/0133341 A1 | 7/2004 | Spriggs | |
| 2005/0116829 A1 | 6/2005 | Koenig et al. | |
| 2005/0178602 A1 | 8/2005 | Bolduc et al. | |
| 2006/0184292 A1* | 8/2006 | Appleby | F41H 13/00 701/23 |
| 2007/0001831 A1 | 1/2007 | Raz et al. | |
| 2008/0027590 A1 | 1/2008 | Phillips et al. | |
| 2008/0086241 A1 | 4/2008 | Phillips et al. | |
| 2010/0063652 A1 | 3/2010 | Anderson | |
| 2010/0063664 A1 | 3/2010 | Anderson | |
| 2010/0066587 A1 | 3/2010 | Yamauchi et al. | |
| 2010/0094499 A1 | 4/2010 | Anderson | |
| 2010/0201829 A1 | 8/2010 | Skoskiewicz et al. | |
| 2012/0101660 A1 | 4/2012 | Hattori | |
| 2012/0215641 A1 | 8/2012 | Ohki | |
| 2013/0024060 A1 | 1/2013 | Sukkarié et al. | |
| 2013/0079964 A1* | 3/2013 | Sukkari | G01C 21/3697 701/22 |
| 2013/0158795 A1 | 6/2013 | Hahne | |
| 2013/0211660 A1* | 8/2013 | Mitchell | G08G 1/127 701/29.3 |
| 2014/0330479 A1* | 11/2014 | Dolgov | B60W 30/16 701/28 |
| 2015/0081162 A1* | 3/2015 | Mitchell | B60W 40/09 701/32.4 |
| 2015/0081399 A1* | 3/2015 | Mitchell | G06Q 10/0639 705/7.38 |
| 2015/0170439 A1* | 6/2015 | Chen | G07C 5/008 701/31.4 |

OTHER PUBLICATIONS

Appendix P; List of IBM Patent or Applications Treated as Related, Aug. 26, 2015, 2 pages.

Hemmerstoffer, Steve, "Autonomous Car Driving through heavy City Traffic (video)", uploaded on Oct. 10, 2010, provided in disclosure on Sep. 28, 2013, <http://www.youtube.com/watch?v=BrmorE5W1tM>.

James, Leon Dr., "Principles of Driving Psychology", Professor of Psychology, University of Hawaii, 1996-2007, provided in disclosure on Sep. 28, 2013, <http://www.drdriving.org/articles/driving_psy.htm>.

Lavrinc, Damon, "Google's Eric Schmidt: Our autonomous cars drive better than you . . . when you're drunk", Autoblog, © Copyright 2014 AOL Inc., provided in disclosure on Sep. 28, 2013,<http://www.autoblog.com/2011/09/29/googles-eric-schmidt-our-autonomous-cars-drive-better-than-you/>.

Markoff, John, "Smarter Than You Think Google Cars Drive Themselves, in Traffic", NYTimes.com, Copyright 2010 The New York Times Company, provided in disclosure on Sep. 28, 2013,<http://www.nytimes.com/2010/10/10/science/10google.html>.

Shirley, Nat, "Google's autonomous car target: 1M accident-free miles", New and Used Car Reviews, Research & Automotive-Industry News & LeftLaneNews, Copyright © 2005-2013 MNM Media, LLC., provided in disclosure on Sep. 28, 2013,<http://www.leftlanenews.com/googles-autonomous-car-target-1m-accident-free-miles.html>.

Silver et al., "Learning Autonomous Driving Styles and Maneuvers from Expert Demonstration", Carnegie Mellon University, pp. 1-15, International Symposium on Experimental Robotics, Jun. 2012, <http://www.ri.cmu.edu/publication_view.html?pub_id=7225>.

"Algeria", Wikitravel, The Free Travel Guide, this page was last modified on Jan. 2, 2014, at 07:06, provided in disclosure on Sep. 28, 2013, <http://wikitravel.org/en/Algeria>.

"Autonomous car", Wikipedia, the free encyclopedia, this page was last modified on Jan. 29, 2014, at 19:23, provided by inventors in disclosure Aug. 29, 2013, <http://en.wikipedia.org/wiki/Autonomous_car>.

"Bad habits create bad accidents", Drive Alive™, provided by inventors in disclosure Aug. 29, 2013, <http://www.allencountydrivealive.org/Bad%20Habits.htm>.

"California Driving: Bad Habits (and Worse)", California Driving Guide: Californian Driving Habits and Quirks, Text and images Copyright © 2012 Hamish Reid, Oakland,California, provided in disclosure on Sep. 28, 2013, <http://www.caldrive.com/habits.html>.

"Facial Expression Recognition Software", Emotient Products, © Copyright 2014 Emotient, Inc., provided in post disclosure on Aug. 29, 2013, <http://www.emotient.com/products>.

"Google wants autonomous vehicles on streets in 3-5 years", TG Daily, Posted Feb. 11, 2103 - 10:43 by Thomas Anderson, provided by inventors in disclosure Aug. 29, 2013, <http://www.tgdaily.com/general-science-brief/69409-google-wants-autonomous-vehicles-on-streets-in-3-5-years#uxstwwDr7s1aQqqM.99 >.

"Michigan Could Approve Autonomous Vehicle Licensing as Soon as This Week", DailyTech, Tiffany Kaiser—Apr. 17, 2013 12:47 AM, provided by inventors in disclosure Aug. 29, 2013, <http://www.dailytech.com/Michigan+Could+Approve+Autonomous+Vehicle+Licensing+as+Soon+as+This+Week/article30364.htm>.

"Musk says Tesla is at work on autopilot feature", CNN Money, by James O'Toole @jotoole Sep. 18, 2013: 7:16 PM ET, provided by inventors in disclosure Aug. 29, 2013, <http://money.cnn.com/2013/09/18/autos/tesla-autopilot-musk/index.html>.

"Regional bad driving habits", Fuel Economy, Hypermiling, EcoModding News and Forum—EcoModder.com, Copyright© 2000-2014, vBulletin Solutions, Inc., provided in disclosure on Sep. 28, 2013, <http://ecomodder.com/forum/showthread.php/regional-bad-driving-habits-14430-3.html>.

"Regional differences (best, truck, drivers, Texas)—Sports cars, sedans, coupes, SUVs, trucks, motorcycles, tickets, dealers, repairs, gasoline, drivers . . . —City-Data Forum", provided in disclosure on Sep. 28, 2013, © 2005-2014, Advameg, Inc., <http://www.city-data.conn/forum/automotive/889008-regional-differences.html>.

"Straight Dope Message Board", vBulletin® v3.7.3, Copyright © 2000-2014, Jelsoft Enterprises Ltd., provided in disclosure on Sep. 28, 2013, <http://boards.straightdope.com/sdmb/archive/index.php/t-131258.html>.

"Traffic psychology", Wikipedia, the free encyclopedia, this page was last modified on Aug. 20, 2013, at 12:59, provided by inventors in disclosure Aug. 29, 2013, <http://en.wikipedia.org/wiki/Traffic_psychology>.

* cited by examiner

REGIONAL DRIVING TREND MODIFICATION USING AUTONOMOUS VEHICLES

FIELD OF THE INVENTION

The present invention relates generally to the field of autonomous vehicles, and more particularly to modifying regional driving trends using autonomous vehicles.

BACKGROUND OF THE INVENTION

Autonomous vehicles are automobiles that have the ability to operate and navigate without human input. Autonomous vehicles use sensors, such as radar, LIDAR, global positioning systems, and computer vision, to detect the vehicle's surroundings. Advanced computer control systems interpret the sensory input information to identify appropriate navigation paths, as well as obstacles and relevant signage. Some autonomous vehicles update map information in real time to remain aware of the vehicle's location even if conditions change or the vehicle enters an uncharted environment. Autonomous vehicles increasingly communicate with remote computer systems via wireless network connections and with one another using dedicated short range communications (DSRC).

Driving habits vary by region. For example, acceptable speeds in excess of the speed limit, or amount of space left between cars traveling on a busy road depend on the region and driving conditions. Many of these habits are learned behaviors, and other drivers in the region expect those cars around them to operate according to the regional standards.

SUMMARY

Embodiments of the present invention disclose a method, computer program product, and a computer system for modifying regional driving habits. A computer determines a first value associated with a regional driving habit for a region. The computer determines a second value associated with a target driving habit, wherein the second value is not substantially equivalent to the first value. The computer determines that a number of at least semi-autonomous vehicles in an area is above a threshold value. The computer transmits information instructing the number of at least semi-autonomous vehicles to operate based on the second value.

DETAILED DESCRIPTION

Embodiments of the present invention recognize that unsafe regional driving habits pose a potential hazard to both drivers and passengers. Unsafe regional driving habits are typically learned behaviors and can, therefore, be unlearned by observation of, and assimilation with, automobiles operating with safe driving habits. Various embodiments of the present invention disclose the use of autonomous or semi-autonomous vehicles to exhibit safe driving habits for drivers of manually operated or partially manually operated vehicles.

Figure 1:
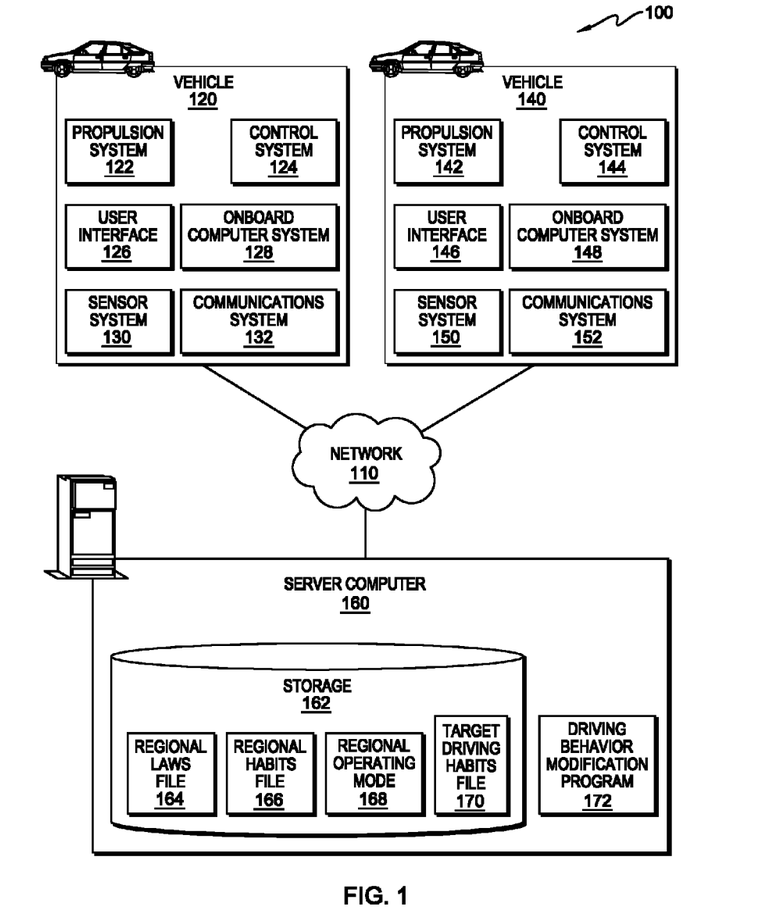
FIG. 1 is a functional block diagram illustrating an autonomous vehicle environment, in accordance with an embodiment of the present invention.

The present invention will now be described in detail with reference to the Figures. FIG. 1 is a functional block diagram illustrating an autonomous vehicle environment ("environment"), generally designated 100, in accordance with an embodiment of the present invention. Environment 100 includes vehicles 120 and 140 and server computer 160, all interconnected over network 110. Network 110 can be, for example, a local area network (LAN), a wide area network (WAN), such as the Internet, a dedicated short range communications network, or any combination thereof, and may include wired, wireless, fiber optic, or any other connection known in the art. In general, the communication network can be any combination of connections and protocols that will support communication between vehicle 120, vehicle 140, and server computer 160, in accordance with an embodiment of the present invention.

Vehicles 120 and 140 are motorized vehicles operating within a defined regional boundary. In various embodiments of the present invention, vehicles 120 and 140 can be autonomous, semi-autonomous, partially manually operated, manually operated, or a combination thereof. In one embodiment, vehicle 120 represents one or more autonomous vehicles operating within a defined regional boundary and vehicle 140 represents one or more manually operated vehicles operating within the same regional boundary. In various embodiments, vehicles 120 and 140 include propulsion systems 122 and 142, control systems 124 and 144, user interfaces 126 and 146, onboard computer systems 128 and 148, sensor systems 130 and 150, and communications systems 132 and 152, respectively.

Propulsion systems 122 and 142 include components operable to provide powered motion to vehicles 120 and 140, respectively. In various embodiments, propulsion systems 122 and 142 can include an engine/motor, an energy source, a transmission, and/or wheels/tires. The engine/motor can be any combination of an internal combustion engine, an electric motor, a steam engine, a Stirling engine, or other types of engines/motors. In some embodiments, propulsion systems 122 and 142 can include multiple types of engines and/or motors, such as, a gas-electric hybrid car. The energy source can be, for example, gasoline, diesel, other petroleum-based fuels, propane, other compressed gas-based fuels, ethanol, solar panels, and/or batteries. In various embodiments, the transmission can include a gearbox, clutch, differential, and drive shafts.

Control systems 124 and 144 are collections of mechanical, electro-mechanical, and electronic systems that can be configured to control the operations of vehicles 120 and 140, respectively. In various embodiments, control systems 124 and 144 can each include a steering unit, a throttle, a brake unit, and/or a navigation system. In an embodiment, the steering unit can be a mechanism that can control the heading and/or turning of the vehicle. In one embodiment, the throttle can be configured to control the operating speed of the engine/motor and, in turn, the speed of the vehicle. In some embodiments, the brake unit can include any combination of mechanisms configured to decelerate the vehicle. The brake unit can use, for example, friction to slow the rotation of the tires/wheels. In some embodiments, the brake unit converts kinetic energy of the wheels/tires into electrical current. In various embodiments, the navigation system can be any system configured to determine a driving path for the vehicle. In some embodiments, the navigation system receives input information from the GPS and camera systems included in sensor systems 130 or 150 in order to generate the driving path for the vehicle.

User interfaces 126 and 146 are mechanisms by which a passenger in vehicles 120 and 140, respectively, can interact with the vehicle. User interfaces 126 and 146 can include buttons, knobs, levers, pedals, paddles, and/or any other type of user interface, such as a touchscreen display capable of detecting the location and/or movement of a user's finger. The touchscreen can be, for example, a capacitive sensing screen, a resistance sensing screen, or a surface acoustic wave sensing screen.

Onboard computer systems 128 and 148 are computing systems including at least one computer processor, that is capable of controlling one or more functions of vehicles 120 and 140, respectively, based on inputs received from one or more of the systems included in the vehicle. For example, in an embodiment, onboard computer system 128 can control propulsion system 122 based on inputs received from sensor system 130.

Sensor systems 130 and 150 include any number of sensors configured to detect information about vehicles 120 and 140, respectively, and their surrounding environment. In various embodiments, sensor systems 130 and 150 can include a global positioning system (GPS), an inertial measurement unit (IMU), a RADAR unit, a LIDAR unit, and/or a camera. The GPS can be any sensor configured to estimate a geographic location. The IMU can be any combination of sensors configured to sense position and orientation changes in a vehicle based on inertial acceleration. The RADAR unit can be any system that uses radio signals to sense objects within the local environment of a vehicle. In various embodiments, the RADAR unit can also detect relative motion between the vehicle and the vehicle's surroundings. The LIDAR unit can be any system configured to sense objects in the vehicle's environment using one or more lasers. The camera can include one or more devices configured to capture a plurality of images of the environment of a vehicle. The camera can be a still or a video camera and may record visible and/or infrared light.

Communications systems 132 and 152 can be any system configured to communicate with one or more devices directly or via network 110. In various embodiments, communications systems 132 and 152 can include a transmitter and a receiver for sending and receiving electromagnetic waves, respectively, such as an antenna.

Server computer 160 can be a desktop computer, a laptop computer, a tablet computer, a specialized computer server, a smartphone, or any other computer system known in the art. In certain embodiments, server computer 160 represents a computer system utilizing clustered computers and components that act as a single pool of seamless resources when accessed through network 110, as is common in data centers and with cloud computing applications. In general, server computer 160 is representative of any programmable electronic device or combination of programmable electronic devices capable of executing machine-readable program instructions and communicating with other computing devices via a network. Exemplary components of server computer 160 are described in greater detail with regard to FIG. 4. Server computer 160 includes storage 162 and driving behavior modification program 172. Storage 162 includes regional laws file 164, regional habits file 166, regional operating mode 168, and target driving habits file 170.

Storage 162 is a computer readable storage device that maintains information detailing regional traffic laws and regional driving habits. In various embodiments, storage 162 can be a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Regional laws file 164 is a collection of information describing various traffic laws for one or more driving regions. Regional laws file can include information on, for example, state and local traffic laws, including speed limits, passing rules, ability to turn at a red light, and yielding right of way. In one embodiment, regional laws file 164 includes a database that comprises a set of regional laws and a set of defined regions, wherein the database indicates which laws apply in which regions, as in a two-dimensional table or array. In one embodiment, server computer 160 may periodically update regional laws file 164 via network 110.

Regional habits file 166 is a collection of information describing various regional traffic habits that characterize drivers in that region but are not explicitly detailed in regional laws file 164. Regional habits file 166 can include, for example, regional habits, such as how multi-way stop signs are handled, regionally acceptable deviations from the speed limit, passing etiquette, aggressiveness when merging, distance between cars, turn signal timing, use of turn signals, stopping habits, accelerating habits, turning habits, response to emergency vehicles, and customs relating to yielding right of way. In general, regional habits file 166 can include any information that describes how drivers in a region behave in certain situations. In various embodiments, regional habits file 166 can be a database that includes a set of regional driving habits and a set of defined regions, wherein the database indicates to which regions a particular driving habit applies, as in a two-dimensional table or array. In one embodiment, server computer 160 may periodically update regional habits file 166 via network 110.

Regional operating mode 168 is a collection of operational rules that govern the operation of one or more autonomous cars operating in a defined region. Regional operating mode 168 instructs vehicle sensors, such as sensor system 130 on vehicle 120, to observe the physical surroundings of vehicle 120 and control the movement and operation of vehicle 120 according to the operational rules stored in regional operating mode 168. In various embodiments, regional operating mode 168 can include information on the speed of vehicle 120, safe distance, turn signal timing, brake application timing and intensity, acceleration, merging, and any other operation carried out by vehicle 120.

Target driving habits file 170 is a collection of operational rules that define a safe mode of operation for an autonomous vehicle. In various embodiments, target driving habits 170 can include, for example, instructions for conducting an autonomous vehicle according to the applicable traffic laws in a given region, proper spacing between cars to ensure sufficient time to stop, proper timing and use of turn signals, and any other instruction that can ensure safe conduct of vehicle 120 and passengers therein. In some embodiments, target driving habits file 170 includes at least instructions for operating an autonomous vehicle in accordance with all of the regional traffic laws contained in regional laws file 164. In other embodiments, target driving habits file 170 includes additional rules that supplement the minimum set of rules to comport with regional laws that further guarantee safe driving conduct.

Driving behavior modification program 172 is a computer implemented software application residing on server computer 160. Driving behavior modification program 172 determines that a sufficient number of autonomous vehicles are currently operating in a given area and directs one or more autonomous vehicles to deviate from the regional operating mode in such a manner as to exhibit vehicle operation that more closely aligns with behaviors detailed in target driving habits file 170 than those in regional habits file 168.

Figure 2:
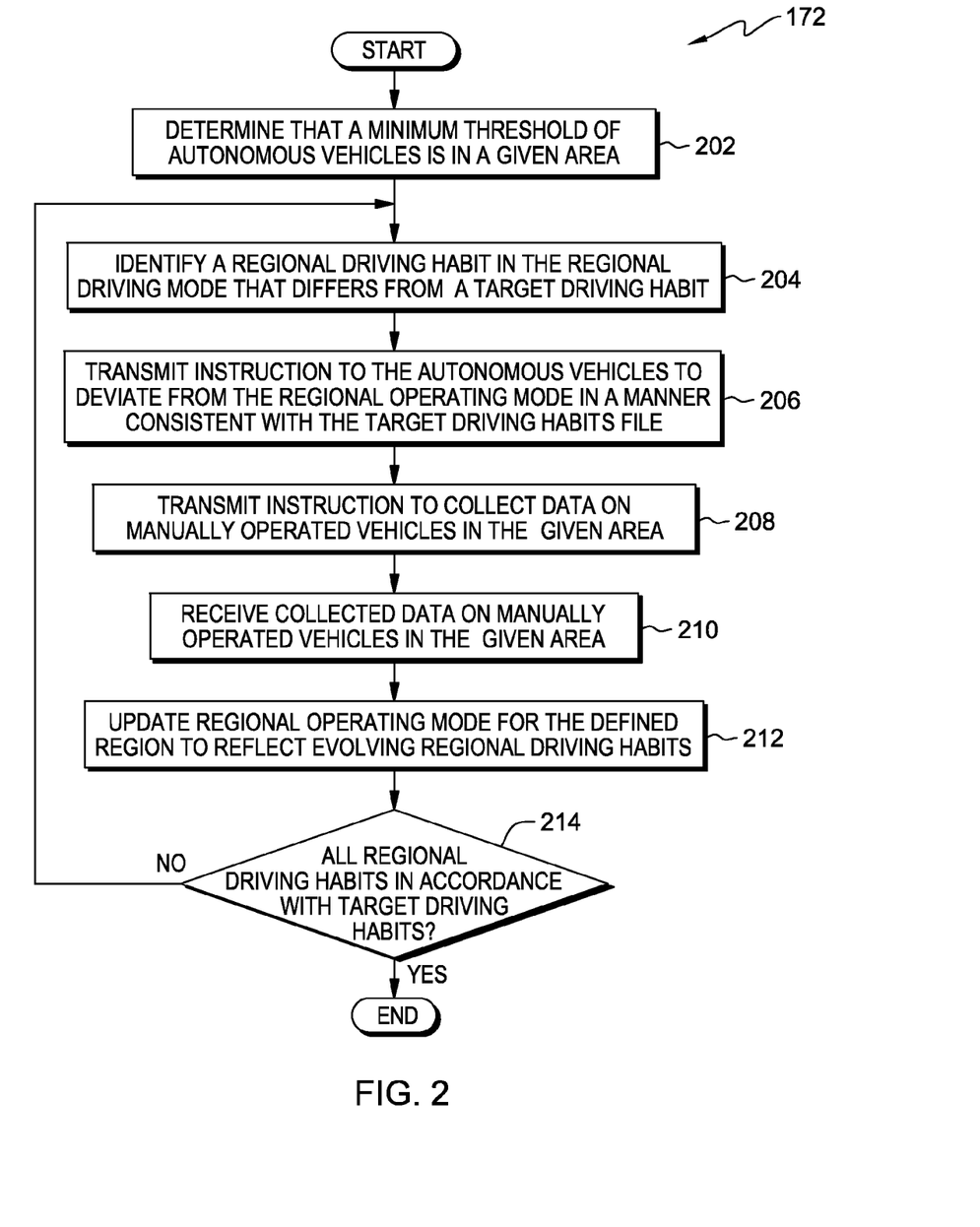
FIG. 2 is a flowchart depicting operational steps of a driving behavior modification program, operating on a server computer within the autonomous vehicle environment of FIG. 1, in accordance with an embodiment of the present invention.

FIG. 2 is a flowchart depicting operational steps of driving behavior modification program 172, in accordance with an embodiment of the present invention. To begin with, vehicle 120 is an autonomous vehicle operating in a given area. Vehicle 120 operates according to regional operating mode 168. Regional operating mode 168 is a determined set of rules for governing the behavior of vehicle 120 based on at least the location of vehicle 120 within a defined region and regional laws file 164 and regional habits file 166, both of which apply in the given area. Within the given area are one or more other autonomous vehicles and at least one manually operated, or at least partially manually operated, vehicles, such as vehicle 140. Vehicle 120 maintains a periodically updated list of the number of vehicles in a given area, which can be the same as or different from the defined region. In some embodiments, the list can be maintained in local memory that is part of onboard computing system 128. In other embodiments, the list can be stored on server computer 160 and periodically updated via communication between server computer 160 and onboard computer system 128 via network 110. Vehicle 120 also maintains the status of each of the vehicles in the given area as autonomous, semi-autonomous, partially manually operated, or manually operated. In various embodiments, the status of other vehicles as autonomous, semi-autonomous, manually operated, or partially manually operated can be determined, for example, by communication with other vehicles via network 110 or by accessing a remote database via network 110 which maintains a register of registered vehicles and the status of those vehicles. Vehicle 120 can collect the information necessary to maintain the requisite information using various sensors, such as those included in sensor system 130, and by communicating with other vehicles over network 110 using onboard computer system 128 and communications system 132.

Driving behavior modification program 172 determines that a minimum threshold of autonomous vehicles is in a given area (step 202). Various embodiments of the present invention recognize that many behaviors, including safe driving habits, are learned and imitated. Based on this fact, an increased number of autonomous vehicles operating in a safe manner further impresses on manually operated vehicle drivers the observed habits. In various embodiments, the minimum threshold can be based on a percentage of autonomous vehicles operating in the given region. For example, the determination can be made by driving behavior modification program 172 dividing the number of autonomous vehicles or semi-autonomous vehicles in the given area by the total number of vehicles in the given area. In one embodiment, the minimum threshold can be that sixty (60) percent of the vehicles in the given area are autonomous or semi-autonomous. The determination is made based on the periodically updated information collected by vehicle 120 operating in the given area. In one embodiment, the threshold can be a purely numerical value, such as at least 5 autonomous vehicles in the given area. Determination of the proper threshold can also depend on the type of road, the geographical region in which the vehicles are operating, and the road conditions at the time of the determination.

Driving behavior modification program 172 identifies a regional driving habit in regional operating mode 168 that differs from a target driving habit (step 204). Driving behavior modification program 172 compares specific habits that are part of regional operating mode 168 with those habits contained in target driving habits file 170 in order to identify a specific habit that occurs in target driving habits file 172 but does not occur in regional operating mode 168. For example, a specific target driving habit included in target driving habits file 170 can be "drive the posted speed limit." In regional operating mode 168, the corresponding speed rule can be "exceed the posted speed limit within five miles per hour." Driving behavior modification program 172 can identify that the target driving habit of driving the posted speed limit is not included regional operating mode 168 by comparing each habit that makes up regional operating mode 168 with each habit that makes up target driving habits file 170.

Driving behavior modification program 172 transmits instructions to the onboard computer systems of the autonomous vehicles in the given area, via network 110, to deviate from regional operating mode 168 in a manner consistent with target driving habits file 170 (step 206). In various embodiments, driving behavior modification program 172 calculates a deviation from regional operating mode 168 with respect to a specific, quantifiable driving habit (e.g., speed, turn signal timing, distance between vehicles) so that the deviation results in the operation of vehicle 120 in a manner more consistent with the habits as detailed in target driving habits file 170. For example, driving behavior modification program 172 can transmit instructions to travel at the posted speed limit (as in target driving habits file 170) rather than exceed the speed limit (as detailed in regional operating mode 168). In various embodiments, the instructions to deviate from regional operating mode 168 can be based on each individual parameter that defines the regional operating mode, or the instructions can be more broadly defined, such as defining a "target operating mode" which describes an operating mode that complies in all respects with both regional laws file 164 and target driving habits file 170.

Driving behavior modification program 172 transmits instructions to vehicle 120 to collect data on manually operated vehicles in the given area via network 110 (step 208). Driving behavior modification program 172 sends an instruction to onboard computer system 128 via network 110 that instructs sensor system 130 of vehicle 120 to observe and record information on manually operated or partially manually operated vehicles in the given area and to transmit the collected data to server 160 via network 110. In some embodiments, the instructions to collect data are specific to the particular deviation that driving behavior modification program 172 previously instructed autonomous vehicle 120 to perform. For example, if the deviation was with regard to traveling closer to the posted speed limit than regional operating mode 168 requires, then the instructions may pertain to sensor system 130 collecting information on the speed of manually operated vehicles with respect to the posted speed limit. The collection of data regarding the deviations allows driving behavior modification program 172 to maintain current data on regional driving habits.

Driving behavior modification program 172 receives the collected data on manually operated, or partially manually operated, vehicles in the given area from onboard computer system 128 (step 210). In various embodiments, the collected data is received from onboard computer system 128 of vehicle 120, which transmits the collected data to server computer 160 via network 110.

Driving behavior modification program 172 updates regional operating mode 168 for the defined region to reflect evolving regional driving habits (step 212). In various embodiments, server computer 160 adds the collected data to the data from which regional habits file 166 was created. A new regional habits file can be generated from updated information by, for example, taking a numerical average of values included in the collected data. The analysis used to create an updated regional driving habit can vary depending on the driving habit being analyzed. For example, some habits, such as speed and timing of turn signal usage, may include an average of all of the data collected for that driving trend. Other types of analysis can be more sophisticated, such as, taking into account the type of vehicle being observed (make and model), the registration of the vehicle (inside the defined region or outside of it), and/or environmental factors (e.g., traffic density, weather factors, time or day, etc.). In various embodiments, the regional habit created during the analysis can be stored in a single database file such as regional laws file 164 in storage 162. In some embodiments, the determination of a regional driving habit can be based on information within a defined period of time (e.g., the previous six months).

Driving behavior modification program 172 determines whether all regional driving habits included in regional operating mode 168 are in accordance with target driving habits file 170 (decision block 214). Driving behavior modification program 172 compares the numerical values associated with the driving habits in regional operating mode 168 with the numerical values associated with driving habits in target driving habits file 170 to ensure that the numerical values match within a certain range. The range of acceptable matching can be based on a purely numerical assessment (e.g., within one mile per hour) or within a statistical range (e.g., within one standard deviation of the given numerical value). If driving behavior modification program 172 determines that all of the regional driving habits included in regional operating mode 168 are not in accordance with target driving habits file 170 (decision block 214, NO branch), then driving behavior modification program 172 identifies a regional driving habit in the regional operating mode that differs from a target driving habit (step 204). If driving behavior modification program 172 determines that all regional driving habits in regional operating mode 168 are within an acceptable error range of the target driving habits in target driving habits file 170 (decision block 214, YES branch), then driving behavior modification program 172 terminates execution.

Figure 3A:
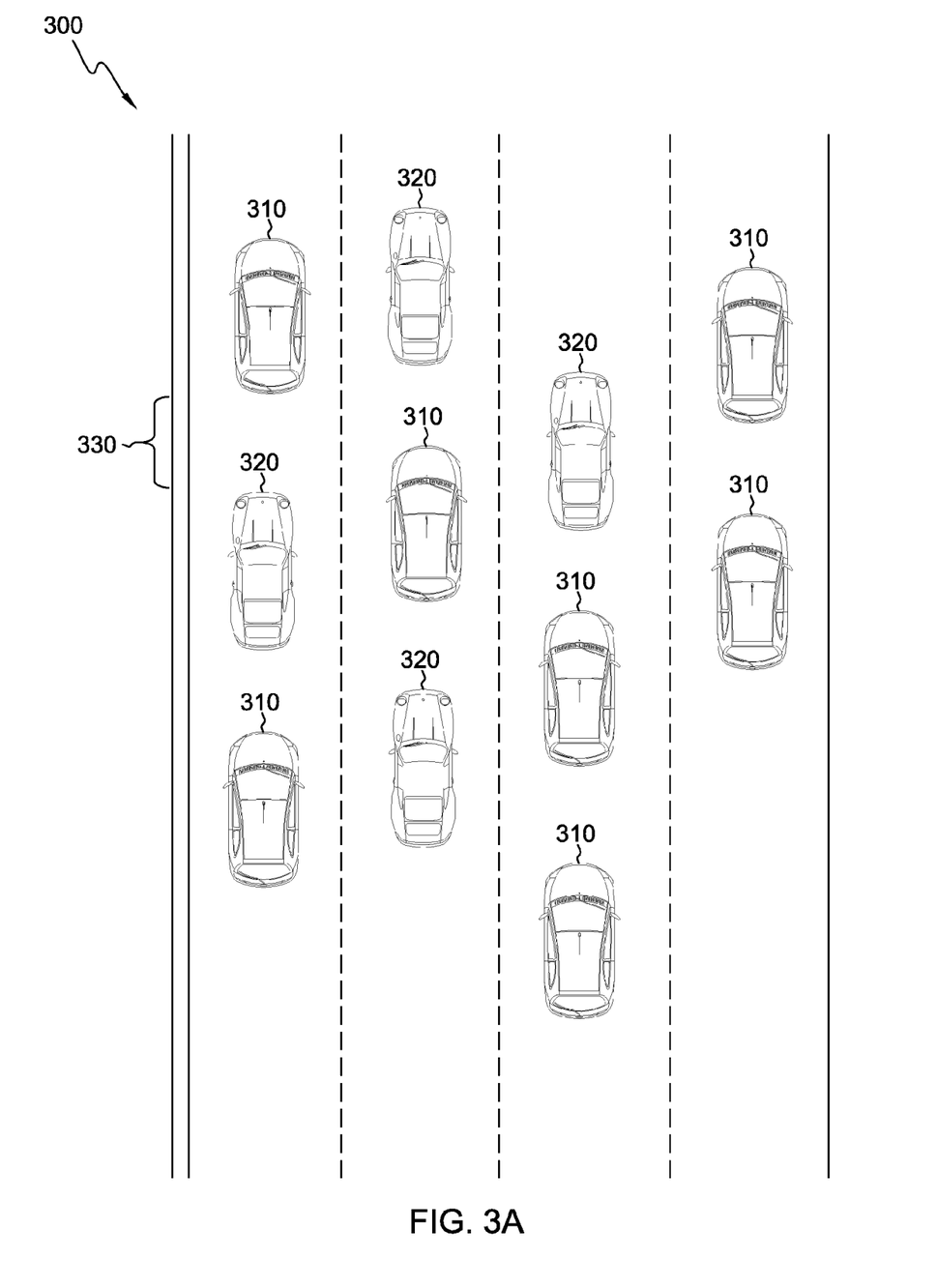
FIG. 3A illustrates an example driving environment in which multiple autonomous vehicles and manually operated vehicles are operating, in accordance with an embodiment of the present invention.

FIG. 3A illustrates an example driving environment in which multiple autonomous vehicles and manually operated vehicles are operating, in accordance with an embodiment of the present invention. In the depicted example driving environment, the minimum concentration of autonomous vehicles necessary to trigger driving behavior modification program 172 is sixty percent. In the example driving environment, there are four autonomous vehicles 320 and seven manually operated vehicles 310. Therefore, the minimum threshold of sixty percent autonomous vehicles is not met in the example driving environment of FIG. 3A. Because the minimum threshold is not met in the example embodiment, autonomous vehicles 320 operate according to the regional operating mode that applies in the given area (i.e., the depicted example driving environment). In the example embodiment, autonomous vehicles 320 trail manually operated vehicles 320 at distance 330. Distance 330 is substantially the same distance at which manually operated vehicles 310 within the given area trail other manually operated vehicles and automated vehicles 320. In general, in the example embodiment depicted in FIG. 3A, automated vehicles 320 imitate the behavior of manually operated vehicles 310 by executing regional operating mode 168 in order to assimilate with the regional driving trends.

Figure 3B:
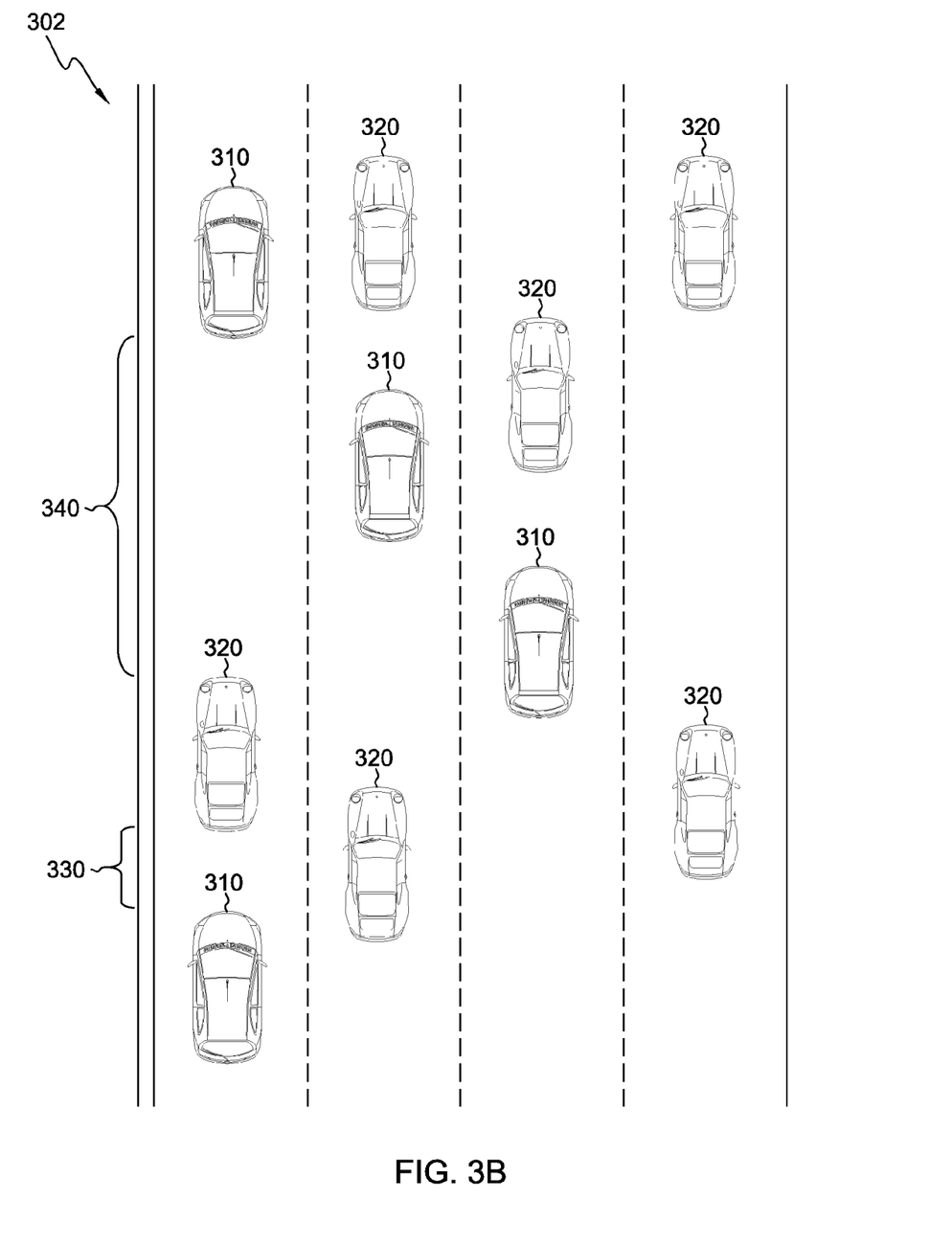
FIG. 3B illustrates an example driving environment in which multiple autonomous vehicles and manually operated vehicles are operating, in accordance with an embodiment of the present invention.

FIG. 3B illustrates an example driving environment in which multiple autonomous vehicles and manually operated vehicles are operating, in accordance with an embodiment of the present invention. In the depicted example driving environment, the minimum concentration of autonomous vehicles necessary to trigger driving behavior modification program 172 is sixty percent. In the example embodiment, there are six automated vehicles 320 and four manually operated vehicles 310. Therefore, the threshold for initiating driving behavior modification program 172 is satisfied. One possible driving habit that driving behavior modification program 172 can modify is the distance between vehicles in the given area. Autonomous vehicles 320 increase the distance between vehicle 320 and the vehicle immediately in front of vehicle 320. In the example embodiment, the increased distance is gap 340 while the regional driving habit is following at distance 330. Over time, as the drivers of manually operated vehicles 310 observe more autonomous vehicles following at the safer distance of gap 340, distance 330 will gradually increase until distance 330 is substantially the same as gap 340.

Figure 4:
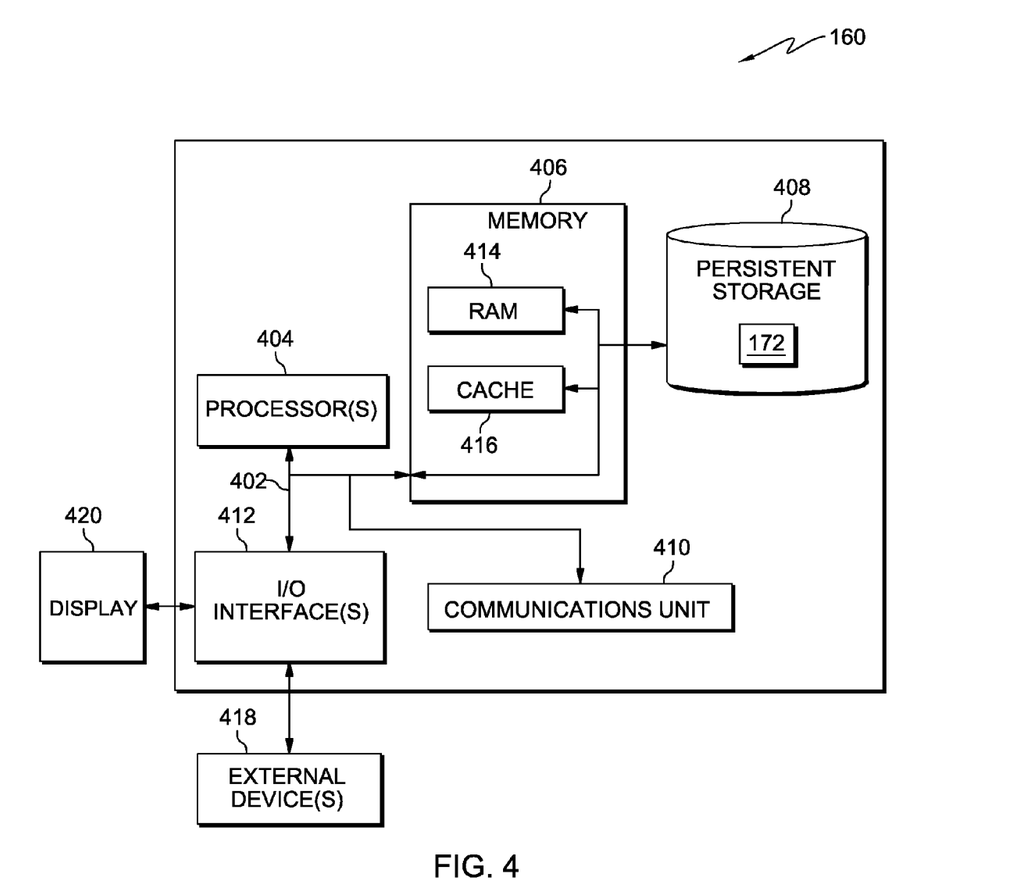
FIG. 4 depicts a block diagram of components of the server computer executing the regional operating mode generator and the experimentation and update module, in accordance with an embodiment of the present invention.

FIG. 4 depicts a block diagram of components of server computer 160 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer 160 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Driving behavior modification program 172 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of vehicles 120 and 140. In these examples, communications unit 410 includes one or more network interface cards. Communications unit 410 may provide communications through the use of either or both physical and wireless communications links. Driving behavior modification program 172 may be downloaded to persistent storage 408 through communications unit 410.

I/O interface(s) 412 allows for input and output of data with other devices that may be connected to server computer 160. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., driving behavior modification program 172, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA)

may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for modifying regional driving habits, the computer program product comprising:
   one or more computer-readable storage media and program instructions stored on the one or more computer-readable storage media, the program instructions comprising:
      program instructions to determine a first value associated with a regional driving habit for a region;
      program instructions to determine a second value associated with a target driving habit, wherein the second value is not equivalent to the first value;
      program instructions to determine that a number of at least semi-autonomous vehicles in an area is above a threshold value; and
      program instructions to transmit information instructing the number of at least semi-autonomous vehicles to operate based on the second value.

2. The computer program product of claim 1, wherein the program instructions further comprise:
   program instructions to receive data detailing the operation of the one or more at least partially manually operated vehicles related to the regional driving habit with which the first value is associated; and
   program instructions to update the first value based, at least in part, on the data detailing the operation of the one or more at least partially manually operated vehicles.

3. The computer program product of claim 2, wherein the program instructions further comprise:
   program instructions to determine that a second number of at least semi-autonomous vehicles in the area is below the threshold value; and
   program instructions to transmit, by one or more computer processors, information instructing the number of at least semi-autonomous vehicles to operate based on the updated first value.

4. The computer program product of claim 2, wherein the data detailing the operation of one or more at least partially manually operated vehicles is collected using one or more sensors mounted on one or more of the at least semi-autonomous vehicles.

5. The computer program product of claim 1, wherein the area is a subset of the region.

6. The computer program product of claim 1, wherein the first value and the second value are numerical representations of a quantifiable driving habit.

7. A computer system for modifying regional driving habits, the computer system comprising:
   one or more computer processors;
   one or more computer-readable storage media;
   program instructions stored on the computer-readable storage media for execution by at least one of the one or more processors, the program instructions comprising:
      program instructions to determine a first value associated with a regional driving habit for a region;
      program instructions to determine a second value associated with a target driving habit, wherein the second value is not equivalent to the first value;
      program instructions to determine that a number of at least semi-autonomous vehicles in an area is above a threshold value; and
      program instructions to transmit information instructing the number of at least semi-autonomous vehicles to operate based on the second value.

8. The computer system of claim 7, wherein the program instructions further comprise:
   program instructions to receive data detailing the operation of the one or more at least partially manually operated vehicles related to the regional driving habit with which the first value is associated; and
   program instructions to update the first value based, at least in part, on the data detailing the operation of the one or more at least partially manually operated vehicles.

9. The computer system of claim 8, wherein the program instructions further comprise:
  program instructions to determine that a second number of at least semi-autonomous vehicles in the area is below the threshold value; and
  program instructions to transmit, by one or more computer processors, information instructing the number of at least semi-autonomous vehicles to operate based on the updated first value.

10. The computer system of claim 8, wherein the data detailing the operation of one or more at least partially manually operated vehicles is collected using one or more sensors mounted on one or more of the at least semi-autonomous vehicles.

11. The computer system of claim 7, wherein the area is a subset of the region.

12. The computer system of claim 7, wherein the first value and the second value are numerical representations of a quantifiable driving habit.

\* \* \* \* \*